Dec. 20, 1966 P. ZUPPIGER 3,292,769
VARYING SPEED CHAIN MECHANISM
Filed May 19, 1964 2 Sheets-Sheet 1
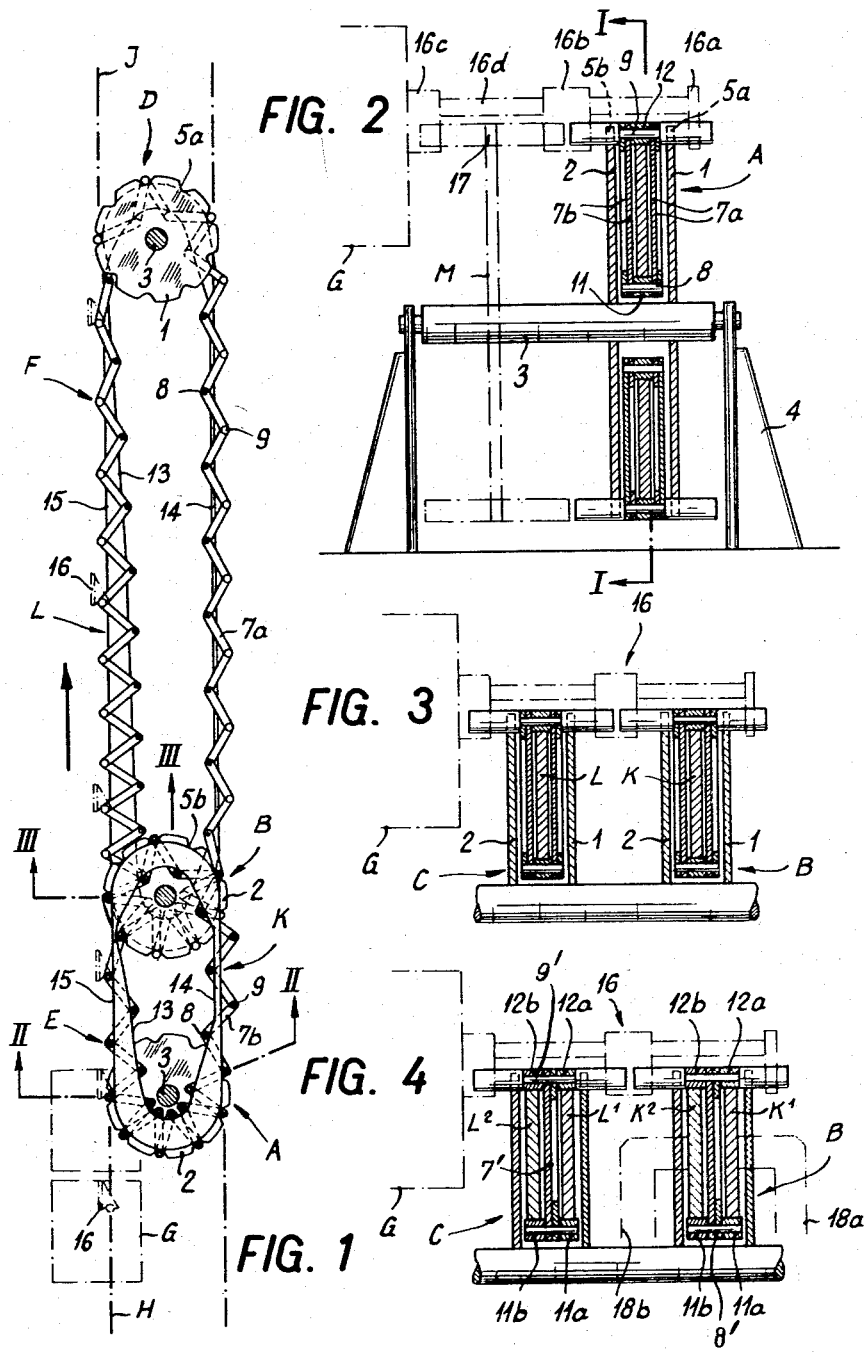
INVENTOR.
PAUL ZUPPIGER Dec. 20, 1966  P. ZUPPIGER  3,292,769
VARYING SPEED CHAIN MECHANISM
Filed May 19, 1964  2 Sheets-Sheet 2

INVENTOR
Paul Zuppiger
BY *John B. Hemenkrant*
ATTORNEY

United States Patent Office 3,292,769
Patented Dec. 20, 1966

3,292,769
VARYING SPEED CHAIN MECHANISM
Paul Zuppiger, Carouge, Switzerland, assignor to
The Battelle Development Corporation
Filed May 19, 1964, Ser. No. 368,551
Claims priority, application Switzerland, June 13, 1963,
7,344/63
35 Claims. (Cl. 198—110)

The present invention relates to varying speed mechanism and more particularly is concerned with mechanism wherein power is transmitted through a chain and speed, such as of a driven load, is varied.

An object of the present invention is the provision of varying speed mechanism wherein a chain interconnecting at least a pair of wheels is varied in speed in a pass of the chain between the wheels such as for the chain to move a load or loads at varying speed along the pass.

Another object of this invention is the provision of varying speed chain mechanism in which the speed of the chain varies in a pass of the chain between the wheels and the wheels at the ends of the pass turn about their axes at different relative speeds with respect to each other.

Other objects of this invention in part will be obvious and in part pointed out more fully hereinafter.

The accompanying drawing illustrates diagrammatically and by way of example several constructional forms of load moving apparatus according to the invention.

FIGURE 1 is a section taken along line I—I of FIGURE 2, of a first constructional form of apparatus;

FIGURE 2 is a section, on an enlarged scale, taken along the line II—II of FIGURE 1;

FIGURE 3 is a section, on an enlarged scale, taken along the line III—III of FIGURE 1;

FIGURE 4 is a section similar to that of FIGURE 3 of a second constructional form of load moving apparatus;

Figure 5:
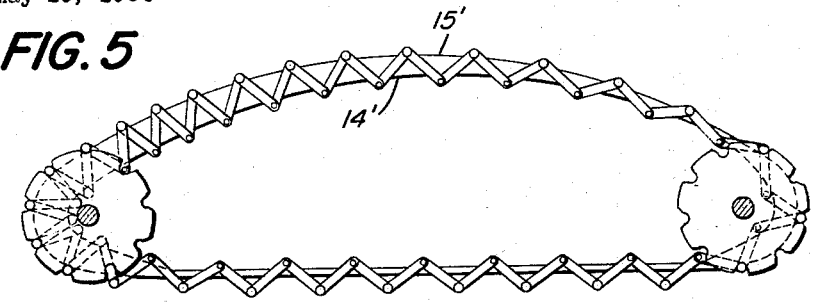
FIGURE 5 is a sectional representation of another modified constructional form of the apparatus.

The two load moving means of the assembly depicted in FIGURES 1 to 3 comprise two pairs of clockwise rotatable wheels A, B and C, D around which pass two endless load-handling chains E and F the top passes of which are intended successively to drive loads G and to impart thereto a progressively increasing speed. In the present instance, the assembly links two means H and J, shown in chain-dotted lines in FIGURE 1, which move the loads G at constant but different speeds, and means J operates at a speed four times greater than that of means H.

Wheels A to D are identical and each include a pair of spaced parallel cheeks 1 and 2 fixed to a hub 3 rotatably mounted in a support, such as 4 (FIGURE 2). Each pair of cheeks is formed with an equal number of pairs of registering notches 5a, 5b regularly distributed over the periphery of the cheeks.

Chains E and F, of identical construction although of differing lengths, comprise a succession of links 7 connected to each other by two series of hinge members 8 and 9, the hinge members in each of the chains being a substantially equal distance apart along the length of the chain. In the constructional form illustrated in FIGURES 1 to 3, the links 7 each consist of two identical and parallel rigid blades 7a and 7b, and the hinge members 8 and 9 consist of axes or pins, the two series of pins 8 and 9 of chains E and F being kept apart by closed loop guide means K and L. The pins 8 of the inner series, which alternate with the pins 9 of the outer series, have a length less than the distance between the cheeks 1 and 2 of the wheels so as to pass therebetween, whereas pins 9 are provided at their ends with extensions of greater diameter forming cylindrical heads which engage in the pairs of notches 5a, 5b thereby to obtain positive engagement between the chains E and F and the wheels with which they cooperate, i.e. a low-frictional engagement without any possible slipping.

The guide means K and L, which are formed by flat stationary closed-loop or circuitous members, are mounted in the spaces between the blades 7a and 7b of the links of chains E and F and between spacer rollers 11 and 12 carried by pins 8 and 9, respectively, and arranged between the blades 7a and 7b. The guide means K and L are thus borne by the chains E and F, which in turn are borne by the wheels A, B and C, D and do not require any other form of support.

The inner edges 13 of the guide means K and L, against which the rollers 11 bear, are shaped, except along the narrow portions 14 of the guide means, in such a manner as to oblige rollers 12 to remain in contact with the major portion of the outer edges 15 of the guide means and as to impose to these rollers 12 and to the pins 9 bearing them, at any instant of their progression, a well defined position along said major portion of edges 15 so that pins 9 will successively and accurately engage in the pairs of notches 5 of wheel A and, once out of these notches, will progressively increase their spacing to come and engage successively and accurately in the pairs of notches of wheel B.

Since the other passes of chains E and F as shown do not take part in the displacement of loads G, it is not essential for the rollers 12 to follow a precisely determined path along portions 14 of the guide means. The function of these portions 14 is to keep the two series of pins 8 and 9 separate from one another.

During operation of the assembly illustrated in FIGURES 1 to 3, wheel A, which is driven by wheel B via chain E, rotates twice as slowly as wheel B despite the fact that their diameters are the same because of the greater folding action to which chain E is subjected by the profiled inner edge 13 of the guide means K at the end of portion 14. Consequently, pins 9, which only engage every second pair of notches of wheel B, engage each pair of notches of wheel A.

Similarly, wheel C, of the second load moving means of the assembly, is fixed on the same shaft with wheel B to rotate at the same speed as the latter wheel, but rotates twice as slowly as the driving wheel D of said second load moving means. Consequently, the speed of the loads G being driven by the assembly illustrated in FIGURES 1 to 3 is increased fourfold between the beginning and the end of the assembly.

The constant speed load moving means H and J can, for example, comprise roller chains. The chain of means H passes around a wheel M (FIGURE 2) which is rigidly mounted on the hub 3 of wheel A and which is formed with notches 17 in register with the pairs of notches 5 of wheel A. Similarily, the chain of means J passes around a wheel (not shown), similar to wheel M, which is fixedly mounted on hub 3 of wheel D and which is also formed with notches arranged opposite the pairs of notches 5 of wheel D.

The fact of fixedly mounting these two pairs of wheels and wheels B and C on common hubs makes it possible to ensure operational synchronization of the four load moving means involved.

The pins of the chains of means H and J and pins 9 all have the same length. In the case of pins 9, the heads of the latter extend substantially beyond cheeks 1 and 2 of wheels A to D (see FIGURES 2 and 3) to enable them to engage hooks 16 of loads G. Since the chains, as well as the wheels, of the four load moving means alternate between two planes, the hooks 16 have three members 16a, 16b and 16c rigidly mounted on a common flat linking element 16d to enable them to operate in either plane, members 16a and 16b cooperating with pins 9 of chain E and the pins of the chain of means J, and members 16b and 16c cooperating with the pins of the chain of means H and the pins 9 of chain F.

Thus, when a load G, driven at constant speed with the chain of means H through the intermediary of members 16b and 16c of its hook, reaches wheels A and M, the pin of the chain of means H engaged in the hook moves out upon passing around wheel M whereas one of the pins 9 of chain E simultaneously takes over by abutting against elements 16a and 16b of the hook. Upon completion of this transfer operation, the load is subjected to acceleration as soon as this pin 9 becomes disengaged from the wheel A. Upon reaching wheels B and C, a transfer operation similar to the preceding one takes place. This transfer operation is again repeated in a similar manner in the region of wheel D and of the adjacent wheel of the load moving means J of higher constant speed.

When loads G arrive end to end along the chain of means H, every second pin 9 of chain E is put to use, whereas along chain F only every fourth pin 9 of this chain is used, thereby making it possible to achieve continuity of the progressive spacing between loads that is brought about along the assembly.

When for example the loads G are rail mounted vehicles, a second assembly of load moving means is preferably provided alongside the first and arranged so as to cooperate with corresponding hooks secured to the opposite sides of the vehicles, in order to avoid eccentric effects.

The means for moving loads at variable speed illustrated in FIGURE 4 differ from those described previously in that chains E and F and guide means K and L have been modified.

In this second constructional form, the chain links 7' only have a single blade and the guide means have been divided into two identical and parallel circuitous or annular members, $K^1$, $K^2$ and $L^1$, $L^2$, mounted on opposite sides of the links of each chain. Links 7' are in this case pivotally mounted on the middle portion of pins 8' and 9', each pin 8' carrying two rollers 11a and 11b and each pin 9' carrying two rollers 12a and 12b, located on opposite sides of links 7'.

Since members $K^1$, $K^2$, $L^1$ and $L^2$ of the guide means are not carried inside the chains as in the previous case, the guide means is securely mounted on supports such as 18a and 18b.

The above described assemblies can be used in a horizontal position, in a vertical position, in intermediate sloping positions, or in a combination of these positions.

The number of variable speed load moving means in the illustrated assemblies may be increased; for example, a third load moving means, similar to the first two, may be added after the second in the plane of the first by shifting the higher constant speed load moving means J into the plane of the lower constant speed load moving means H and of the second section of the assembly of variable speed load moving means, the result of which would be to increase eightfold the initial speed of the vehicles in the illustrated constructional forms.

Although the drawings illustrate assemblies of variable speed load moving means, it is clear that these means may be used individually.

The hereinbefore described variable speed load moving means each enable the speed of the vehicles driven thereby to be doubled. However, it is also possible to have load moving means with which a different ratio may be obtained, either greater or smaller, an integer or a fraction. This conveniently is achieved by modifying the arrangement of the notches around the wheels. Taking by way of example the first load moving means of the assembly illustrated in FIGURE 1, independently of the second load moving means, a ratio of 1.5 can be obtained by reducing from nine to six the number of pairs of notches on wheel B and by modifying the shape of the inner edge 13 of guide means K so that pins 9 engage all of the notches and not only every second notch of wheel B as in FIGURE 1. The ratio of 1.5 is also obtained by retaining nine pairs of notches on wheel B but by reducing the number of pairs of notches on wheel A from nine to six.

Other ratios may also me obtained by modifying the number of pairs of notches either on wheel A or on wheel B or on both wheels. In some cases, it will be necessary to resort to wheels of greater diameter. Indeed, if wheel A of the first load moving means illustrated in FIGURE 1 is used as an example, the inner edge 13 of guide means K in the region of the wheel hub can only take at any one time a limited number of pins 8 because of the sharp curvature of this edge 13. If this number is to be exceeded, wheel A is made larger in order that the curvature of edge 13 may be less sharp around the wheel hub. It is thus possible to have in the same load moving means wheels of different diameter.

The chain link elements may be flexible, for example cable lengths formed with eyelets at their ends, thereby making it possible for the wheels of the variable speed load moving means to be mounted in different planes, the guide means having in such a case a suitably twisted shape.

The illustrated load moving means serve well for moving loads along a rectilinear path. By modifying the shape of the guide means, these load moving means are also used for moving loads along a curvilinear path, such as in an apparatus of FIGURE 5 wherein the guide means is curved along its opposed inner and outer edges 14' and 15' coextending with the related chain pass, to provide a curved guide path and these curved inner and outer edges are at varying distances apart for the distance between alternate hinge members in the pass to vary.

Figure 6:
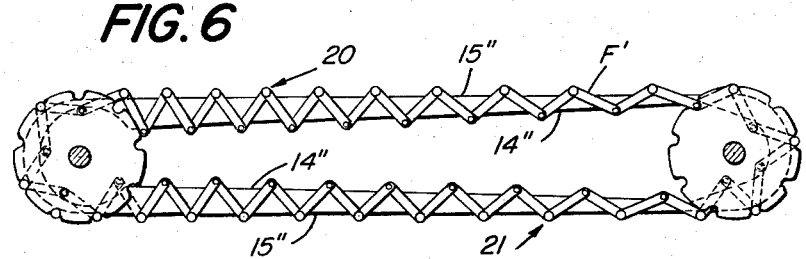
FIGURE 6 illustrates in section another modified constructional form of load moving mechanism.

Various other modifications may be made to the above described variable speed load moving means. For example, in the apparatus of FIGURE 6, two passes of each chain may be utilized, thereby making it possible to have acceleration in one direction and deceleration in the opposite direction. Thus, both passes 20 and 21 are under traction and without appreciable slack as for example through having both wheels on 1:1 ratio engagement with the chain F' and operated as drive wheels, whereupon the inner and outer edges 14" and 15" of the guide means both coact with the chain in both passes. The load moving means may also be designed not only for acceleration or deceleration purposes along each of their chain passes, but also for obtaining a combination of acceleration, deceleration and constant speed by appropriately shaping the guide means.

Figure 7:
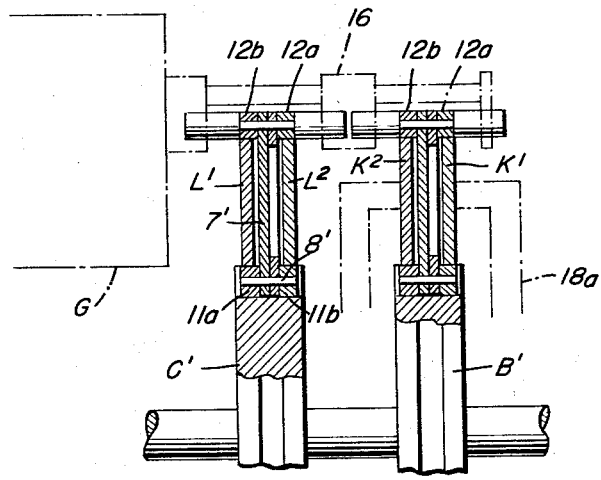
FIGURE 7 is comparative with FIGURE 4 and represents in transverse section another modified form of the apparatus.

In certain embodiments in accordance with the present invention, the guide means passes radially outside the wheels of the varying speed load moving means. One such embodiment, wherein the chain and guide means are similar to those disclosed with reference to FIGURE 4, is comparably represented in FIGURE 7; however, it will be noted that the rollers 11a and 11b of the respective chains engage the notches of wheels C' and B' and that the guide members L' and $L^2$ and the guide members $K^1$ and $K^2$ correspondingly are radially outside the notches. The chains are endless around wheels C' and B' and their associated other wheels (not shown) which likewise have notches engaging the rollers 11a and 11b of the corresponding chains, and the guide members for the respective chains are radially outside the notches of the other wheels.

Figure 8:
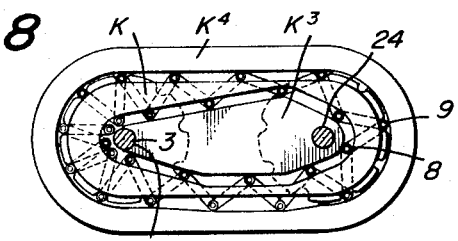
FIGURE 8 is comparative with FIGURE 1 and represents a still further modification.

Chains E and F of the load moving means illustrated in FIGURES 1 to 3, and in certain other embodiments herein, are intended to work under traction. To this end the guide means K and L are mounted between rollers 11 and 12 carried by the two series of pins 8 and 9. The load moving means sometimes however is adapted to permit chains E and F to work whether under traction or under compression depending for example on which of the wheels is a driving wheel of the chains for the other wheels to be driven or on whether the drive input to the chains by the drive wheels or wheel is forward or is reserved. Thus, for example, the load moving unit including chain E in FIGURE 1 is modified through having the guide means for chain E made of three parts of which one is formed by the existing guide means K. The two other parts K³ and K⁴ (see FIGURE 8) have the same thickness as part K and are mounted in the same plane as the latter, one within the loop formed by chain E and the other outside this loop.

The inner part K³ and the middle part K, on the one hand, and the middle part K and the outer part K⁴, on the other hand, form therebetween two endless slots along which travel rollers 11 and 12. Except along the bottom pass of chain E, the slots have a constant width slightly greater than the diameter of rollers 11 and 12 so that the latter may only contact the opposed guide surfaces of outer part K⁴ and inner part K³ of the guide means when chain E works under compression, or may only contact the opposed guide surfaces of middle part K of the guide means when chain E works under traction. Along the bottom side of chain E, one of the slots at least, for example the slot between the middle part K³ and the outer part K⁴ of the guide means, is made wider to accommodate the surplus length of chain E when the middle part K retains a narrow portion along the related pass of the chain such as illustrated in FIGURE 1.

In the region of wheel A, the inner part K³ of the guide means is formed with a semi-circular notch 23 enclosing half of the wheel hub 3, the other half of the hub forming an extension of the inner part of the guide means. In the region of wheel B, the inner guide means part K³ is formed with a hole 24 through which passes the hub of wheel B in order that this part may extend beyond the hub. The inner and outer parts K³ and K⁴ of the guide means are moreover held in place by means of suitable supports (not shown) similar to supports 18 in FIGURE 4. In the case of the outer guide means part K⁴ these supports are secured thereto so as not to interfere with the movement of hooks 16 of loads G. Furthermore, members 16a, 16b and 16c of hooks 16 are extended so that pins 9 may abut against these members despite the presence of the outer guide means part K⁴.

The adaptation of a second load moving means of the assembly is carried out in similar manner.

In the case of the load moving means illustrated in FIGURE 4, these also are readily adapted to enable their chains to operate either under traction or under compression. This adaptation is similar to that of the load moving means illustrated in FIGURES 1 to 3 except that the added outer and inner parts of the guide means have an extent, laterally of the related chains, so as to support both rollers 12a and 12b or both rollers 11a and 11b of the corresponding chain.

If the chains of the above described modified load moving means are intended to operate under compression only, the middle part of the guide means may be omitted.

The opposed inner and outer edges of the guide means along the passes of the chains which travel with the loads thus are disposed at varying distances apart to constrain the links of each chain to zig-zag folded relation and accordingly constrain the corresponding hinge members of the chain in the related pass to vary in distance apart and travel at varying speed.

The different forms of load moving means described above, either alone or in the form of assemblies, can be used for various purposes. Above, reference has been made to the displacement of vehicles. The load moving means could also be used for driving other loads, for example mobile targets required to move forward at variable speeds for shooting practice.

As many possible embodiments of the invention may be made and as many possible changes may be made in the embodiments hereinbefore set forth, it will be distinctly understood that all matter described herein is to be interpreted as illustrative and not as a limitation.

I claim:

1. Varying speed mechanism comprising, a chain having a succession of links and hinge members in first and second series pivotally interconnecting respectively and alternately first adjacent ends of said links and second adjacent ends of said links, a pair of longitudinally spaced wheels mounted to turn about their axes and having portions engaging said chain at said first adjacent ends of said links for said chain to move with said wheels and movably interconnect said wheels through said links and their corresponding said hinge members, and circuitous guide means having opposed guide surfaces engaging said chain respectively at said first adjacent ends and said adjacent ends of said links and disposed at least along a portion of said guide means intermediate said wheels, at varying distance apart to constrain said links to a zig-zig folded relation to each other and constrain said corresponding hinge members thereof to vary in distance apart and thus travel at varying speed along said intermediate portion.

2. Varying speed mechanism according to claim 1, wherein said chain includes rollers in first and second series securely on said links for said series of rollers correspondingly to engage said opposed guide surfaces in rolling contact.

3. Varying speed mechanism according to claim 2, wherein said guide means and said opposed guide surfaces thereof extend between said first and second series of rollers for said links to operate under traction with said wheels.

4. Varying speed mechanism according to claim 1, wherein said hinge members include pins in first and second series pivotally interconnecting respectively said first adjacent ends of said links and said second adjacent ends of said links, and said chain includes rollers in first and second series respectively on said first and second series of pins and correspondingly engaging said opposed guide surfaces in rolling contact.

5. Varying speed mechanism according to claim 4, wherein said pins support pairs of said rollers, said rollers of the pair respectively being outside said links on opposite sides of said links, and said guide means includes a pair of similar guide members having opposed guide surfaces disposed at varying distances apart and said pairs of rollers correspondingly engage said opposed guide surfaces of said guide members in rolling contact.

6. Varying speed mechanism according to claim 1, wherein each of said links includes two spaced substantially parallel link members and said hinge members include pins in first and second series pivotally interconnecting respectively first adjacent ends of said link members and second adjacent ends of said link members, and said chain includes rollers between said link members in first and second series respectively on said first and second series of pins, and said series of rollers correspondingly engage said opposed guide surfaces in rolling contact.

7. Varying speed mechanism according to claim 1, wherein said guide means and said opposed guide surfaces thereof extend between alternate said hinge members of said links for said links to operate under traction with said wheels.

8. Varying speed mechanism according to claim 1, wherein said links and their corresponding said hinge members are situated between said opposed guide surfaces for said links to operate under compression with said wheels.

9. Varying speed mechanism according to claim 8, wherein said chain includes rollers in first and second series securely on said links and said series of rollers correspondingly engage said opposed guide surfaces in rolling contact.

10. Varying speed mechanism according to claim 1, wherein said chain has extensions from said first adjacent ends of said links and said wheels define radial notches and engage said extensions in said notches.

11. Varying speed mechanism according to claim 10, wherein those of said hinge members corresponding to said first adjacent ends of said links are pins pivotally interconnecting said one of said sets of alternate adjacent ends, and said extensions are extensions of said pins.

12. Varying speed mechanism according to claim 11, wherein each of said wheels include cheeks spaced from each other and having said notches, and said guide means extends through the spaces between said cheeks of the wheels and guides said chain for said links to enter and leave said spaces and for said pins to enter and leave said notches.

13. Varying speed mechanism according to claim 11, wherein said guide means extends adjacent to said wheels radially outside said wheel notches and guides said chain for said pins to enter and leave said notches.

14. Varying speed mechanism according to claim 13, wherein said second series of hinge members include means for engaging loads to move them at varying speed along said intermediate portion of said guide means.

15. Varying speed mechanism according to claim 1, wherein said chain has extensions from said first adjacent ends of said links, said extensions being equidistantly removed from each other along the length of said links, and said wheels define radial notches and engage said extensions in said notches, said notches in one of said wheels engaging said chain extensions being differently spaced from each other as compared with the spacing of said notches in the other of said wheels.

16. Varying speed mechanism according to claim 15, wherein those of said hinge members corresponding to said first adjacent ends of said links are pins pivotally interconnecting said one of said sets of alternate adjacent ends, and said extensions are extensions of said pins.

17. Varying speed mechanism according to claim 1, wherein said guide means includes a pair of guide members having thereon two said opposed guide surfaces and said links and their corresponding said hinge members are situated between said two opposed guide surfaces for said links to operate under compression with said wheels, and said guide means further includes an intermediate guide member coextending with said two guide members between said two guide members, said intermediate guide member having a further two said opposed guide surfaces between alternate said hinge members of said links and engaging said chain for said links to operate under traction with said wheels.

18. Varying speed mechanism according to claim 1, wherein said first series of hinge members include means for engaging loads to move them at varying speed along said intermediate portion of said guide means.

19. Varying speed apparatus comprising a plurality of mechanisms according to claim 1 arranged in tandem.

20. Varying speed apparatus according to claim 19, wherein the wheel at each end of each intermediate mechanism is mounted coaxially adjacent to the wheel at the near end of the next said mechanism.

21. Load moving apparatus comprising a plurality of varying speed mechanisms according to claim 1 arranged in tandem, wherein one series of hinge members in each chain include means for engaging loads to move them at varying speed along said intermediate portion of said guide means.

22. Load moving apparatus according to claim 21, wherein the wheel at each end of each intermediate mechanism is mounted coaxially adjacent to the wheel at the near end of the next said mechanism.

23. Load moving apparatus according to claim 21, wherein the load engaging means of each succeeding mechanism engages each load before said load is completely disengaged from the preceding mechanism.

24. Load moving apparatus according to claim 21, wherein two successive said varying speed mechanisms comprise two pairs of wheels, each rotatable in the same direction, around which pass two endless load-handling chains the top passes of which successively drive loads and impart thereto a progressively varying speed.

25. Load moving apparatus according to claim 24, wherein each wheel includes a pair of spaced parallel cheeks fixed to a hub rotatably mounted in a support, and each pair of cheeks is formed with pairs of registering notches regular distributed over the periphery of the cheeks.

26. Load moving apparatus according to claim 25, wherein each chain comprises a succession of links connected to each other by two series of hing members, the hinge members in each chain being a substantially equal distance apart along the length of the chain, the links each consist of two identical and parallel rigid blades, and the hinge members consist of pins, the two series of pins of each chain being kept apart by the circuitous guide means.

27. Load moving apparatus according to claim 26, wherein the pins of the inner series alternate with the pins of the outer series and have a length less than the distance between the cheeks of the wheels so as to pass therebetween, and the pins of the outer series have at their ends extensions of greater diameter forming cylindrical heads which engage in the pairs of notches in the wheels thereby to obtain positive low-frictional engagement between the chains and the wheels with which they cooperate, without any possible slipping.

28. Load moving apparatus according to claim 27, wherein the guide means are formed by flat stationary circuitous members mounted in the spaces between the blades of the links of the chains and between spacer rollers carried by the pins and arranged between the blades, the guide means thus being borne by the chains, which are borne by the wheels, and not requiring any other form of support.

29. Load moving apparatus according to claim 28, wherein the inner edges of the guide means, against which the rollers bear, are shaped, in the regions where loads are engaged, in such a manner as to oblige the rollers to remain in contact with the major portion of the outer edges of the guide means and as to impose to the rollers and to the pins bearing them, at any instant of their progression, a well defined position along said major portion of the outer edges so that the pins successively and accurately engage in the pairs of notches of each wheel and, once out of these notches, progressively vary their spacing to come and engage successively and accurately in the pairs of notches of the other wheel engaged by the same chain.

30. Load moving apparatus according to claim 29, wherein the guide means keep the two series of hinge members separate from each other in regions between wheels where the chains do not move loads.

31. Load moving apparatus according to claim 29, wherein the circumferential distance between the notches engaged by the chain in the intermediate wheel of the first said pair of wheels is A times the circumferential distance between the notches engaged by the chain in the end wheel of said first pair, so that the chain moves A times as fast at said intermediate wheel as it moves at said end wheel.

32. Load moving apparatus according to claim 31, wherein the circumferential distance between the notches engaged by the chain in the end wheel of the second said pair of wheels is B times the circumferential distance between the notches engaged by the chain in the intermediate wheel of said second pair, so that the chain moves B times as fast at said end wheel as it moves at said intermediate wheel.

33. Load moving apparatus according to claim 32, wherein said intermediate wheel of said first pair has the same diameter and the same circumferential distance between the notches engaged by its chain as the diameter and the circumferential distance between the notches of said intermediate wheel of said second pair engaged by its chain, and wherein said intermediate wheels are fixed adjacent coaxially on the same shaft, so that said chains move at the same speed and in synchronism at the intermediate position common to both said successive varying speed mechanisms and the chain at said end wheel of said second pair moves AB times as fast as the chain moves at said end wheel of said first pair.

34. Load moving apparatus according to claim 33, wherein at least one said end wheel is fixed adjacent coaxially on the same shaft with a similar wheel engaging another chain to move at the same speed and in synchronism with the chain on said end wheel for moving loads, engaged successively by said chains, past said wheels.

35. Load moving apparatus according to claim 34, wherein the successive chains move in alternate parallel adjacent planes and the loads engaged by said chains comprise means extending through both said planes for engagement with said chains in each said plane.

References Cited by the Examiner

UNITED STATES PATENTS

| 975,721 | 11/1910 | Russell | 198—137 |
| 1,282,379 | 10/1918 | Christensen | 198—189 |

FOREIGN PATENTS 653,434  5/1951  Great Britain.

EVON C. BLUNK, *Primary Examiner.*

RICHARD E. AEGERTER, *Examiner.*

UNITED STATES PATENT OFFICE
CERTIFICATE OF CORRECTION

Patent No. 3,292,769                            December 20, 1966

Paul Zuppiger

It is hereby certified that error appears in the above numbered patent requiring correction and that the said Letters Patent should read as corrected below.

Column 4, line 11, for "me" read -- be --; column 6, line 20, after "said", second occurrence, insert -- second --; column 8, line 13, for "regular" read -- regularly --; column 10, line 1, for the claim reference numeral "34" read -- 33 --.

Signed and sealed this 26th day of September 1967.

(SEAL)
Attest:

ERNEST W. SWIDER
Attesting Officer

EDWARD J. BRENNER
Commissioner of Patents